United States Patent [19]

Laude-Bousquet

[11] Patent Number: 5,743,110
[45] Date of Patent: Apr. 28, 1998

[54] UNIT FOR DISTRIBUTION AND/OR COLLECTION OF COLD AND/OR OF HEAT

[76] Inventor: Adrien Laude-Bousquet, 70, Avenue de l'Europe, 6940 Anse, France

[21] Appl. No.: 396,714

[22] Filed: Mar. 1, 1995

[30] Foreign Application Priority Data

Mar. 4, 1994 [FR] France .................... 94 02734

[51] Int. Cl.⁶ .................................... F25D 17/02
[52] U.S. Cl. .................... 62/434; 62/125; 62/126; 62/335; 62/475; 62/510; 62/185; 165/50; 165/218
[58] Field of Search ................ 62/434, 435, 436, 62/185, 201, 125, 126, 127, 335, 475, 510; 236/1 B; 165/218, 50

[56] References Cited

U.S. PATENT DOCUMENTS

| | | | |
|---|---|---|---|
| 2,153,696 | 4/1939 | Philipp | 62/185 X |
| 3,482,624 | 12/1969 | Carlson et al. | 165/218 |
| 4,280,335 | 7/1981 | Perez et al. | 62/435 X |
| 4,483,152 | 11/1984 | Bitondo | 62/175 |
| 5,123,262 | 6/1992 | Laude-Bousquet | 62/434 |
| 5,138,845 | 8/1992 | Mannion et al. | 62/185 X |
| 5,139,549 | 8/1992 | Knodel et al. | 62/434 X |

FOREIGN PATENT DOCUMENTS

| | | |
|---|---|---|
| 427648 | 5/1991 | European Pat. Off. |
| 920091 | 3/1947 | France |

Primary Examiner—Harry B. Tanner
Attorney, Agent, or Firm—Oliff & Berridge, PLC

[57] ABSTRACT

Unit for distribution and/or collection of cold and/or of heat, including: (a) a main exchanger (1) of heat between a refrigerant fluid (2, 21, 22) and a heat transfer fluid (3); (b) a means for producing cold with a means for heat exchange with the heat transfer fluid; (c) a closed main circuit (3) for continuous free circulation of the heat transfer fluid; (d) at least one heat transfer fluid drawing loop (7 to 11); characterized in that the flow cross-section of the main circuit (3), the maximum refrigerating power of the means for producing cold, Pmax, expressed in W, and the main heat exchanger (1) are sized relative to one another in order to satisfy, in operation, approximately the relationship: $P_{Max} = f_m \times c \times \Delta T$, in which: $f_m$ is the mass flow rate of the heat transfer fluid, expressed in kg/s; c is the mass heat of the heat transfer fluid, in liquid form, expressed in J/kg/°K.; $\Delta T$ is the difference in temperature of the heat transfer fluid between the exit and the entry of the main exchanger (1).

11 Claims, 5 Drawing Sheets

UNIT FOR DISTRIBUTION AND/OR COLLECTION OF COLD AND/OR OF HEAT

The present invention relates generally to heat transfer, namely the distribution and/or collection of cooling and/or heating energy in various premises or plants, industrial or commercial, and also in dwelling buildings.

In accordance with document EP-A-0 427 648, such a unit has already been described and proposed, including, in general, a) a main heat exchanger between, on the one hand, at least one refrigerant fluid in the course of vaporization and, on the other hand, a heat transfer fluid, for example water with alcohol, in liquid form, but also in two-phase form, including in this case a liquid phase and a solid phase, as a mixture which is sufficiently homogeneous, for example in the form of a sherbet or of an ice slush, to be pumped directly;

b) a means for producing cold, including at least one refrigeration loop consisting traditionally of a compressor for a refrigerant fluid in gas phase, a means for condensing or condenser for compressed refrigerant fluid, a means for heat exchange between the condensed refrigerant fluid and the heat transfer fluid, this being in the main exchanger, and the compressor drawing in the vaporized refrigerant fluid;

c) a main circuit, closed onto itself, for continuous free circulation of the heat transfer fluid, enclosing or connected directly or indirectly to the abovementioned main exchanger; this circuit essentially includes a circulation conduit for the heat transfer fluid and various valves for controlling said fluid; furthermore, the main circuit has an appreciably uniform flow cross-section from one end to the other of said circuit;

d) at least one drawing loop for the heat transfer fluid, including an additional pump for circulating said fluid, the suction and the delivery of which communicate with the same section of the main circuit, and at least one secondary heat exchanger, with a hot source and/or a cold source, for the utilization of the heat transfer fluid, this secondary exchanger being enclosed in or connected, directly or indirectly, to the drawing loop.

A "closed main circuit for continuous free circulation" is intended to mean a circuit, essentially looped onto itself, even if this circuit is in places interrupted by different members such as a pump, a scrubber or a valve. This circuit continuously permits a free circulation of the heat transfer fluid, whatever its physical form, liquid or homogeneous two-phase, essentially without any gas phase above it, and without any hindrance liable to block or restrict its continuously recycled flow.

A "segment" of the main circuit is intended to mean the characteristic according to which the upstream connection and the downstream connection of the same drawing loop are placed, in the direction of travel of the heat transfer fluid, near one another and not arranged far from each other, for example, respectively, on an upstream leg and a downstream leg of the main circuit respectively. And the downstream connection may be arranged upstream of the upstream connection, in the direction of travel of the heat transfer fluid.

A "hot source" or "cold source" is intended to mean, in the thermodynamic sense, any source of heat or cold, whatever its form or its conditions; according to the invention it may, for example, equally well be a heat exchanger or a heat pump or a condenser of a refrigeration unit.

The objective of the present invention is one or more improvements to the unit for distributing and/or collecting cold and/or heat, which are described in document EP-A-0 427 648.

More precisely, the objective of the invention is to limit the thermal inertia of the main circulation circuit for the heat transfer fluid, so as to make it possible to react rapidly to changed or variable temperature conditions at the secondary exchanger of each drawing loop.

In accordance with the present invention it was found that this thermal inertia could be limited by sizing the following components in a particular manner and in relation to one another, namely:

- the flow cross-section of the main circuit, compatible with the circulation of the heat transfer fluid in two-phase form;
- the maximum refrigerating power of the means for producing cold;
- and the main exchanger for heat exchange between the refrigerant fluid and the heat transfer fluid.

According to the present invention it was discovered that thermal inertia could be limited if the sizing of the abovementioned components enabled the following relationship to be observed, approximately, in cold operation:

$$P_{Max} = f_m \times c \times \Delta T$$

in which:

$P_{max}$ is the maximum refrigeration power of the means for producing cold, expressed in W;

$f_m$ is the mass flow rate of the heat transfer fluid, in liquid form, expressed in kg/s, occupying the whole flow cross-section, that is to say without air cavity, of the main heat transfer circuit;

c is the sensible and/or latent mass heat of the heat transfer fluid, in liquid form, expressed in J/kg/°K.;

$\Delta T$ is the difference in temperature of the heat transfer fluid, in liquid form, between the exit and the entry of the main exchanger, expressed in °K.

Obeying the abovementioned relationship enables the charge of heat transfer fluid in the main circuit to be reduced to a minimum, for example by trimming off the peaks of refrigeration consumption, by storage of the heat transfer fluid in two-phase form, communicating with the main circuit, this storage being fed during the periods of low refrigeration consumption and drawn upon during the periods of high refrigeration consumption.

As shown below, obeying this relationship also makes it possible to switch rapidly from a regime of cold production to a regime of heat production, for example for defrosting the main circuit and/or each drawing loop.

The present invention is now described with reference to the attached drawing, in which.

Figure 1:
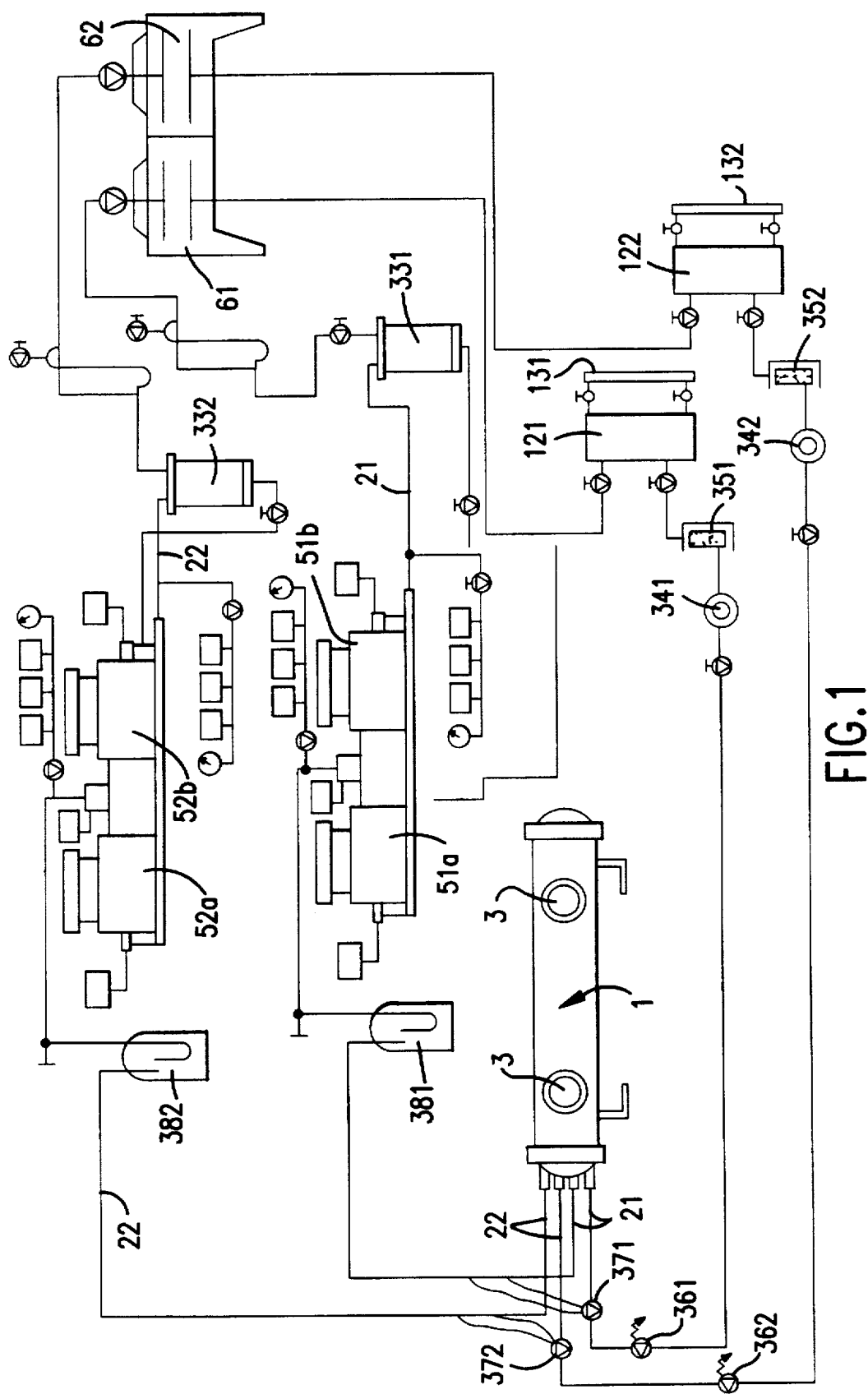
FIG. 1 shows diagrammatically the means for producing cold of a unit according to the invention.
Figure 3:
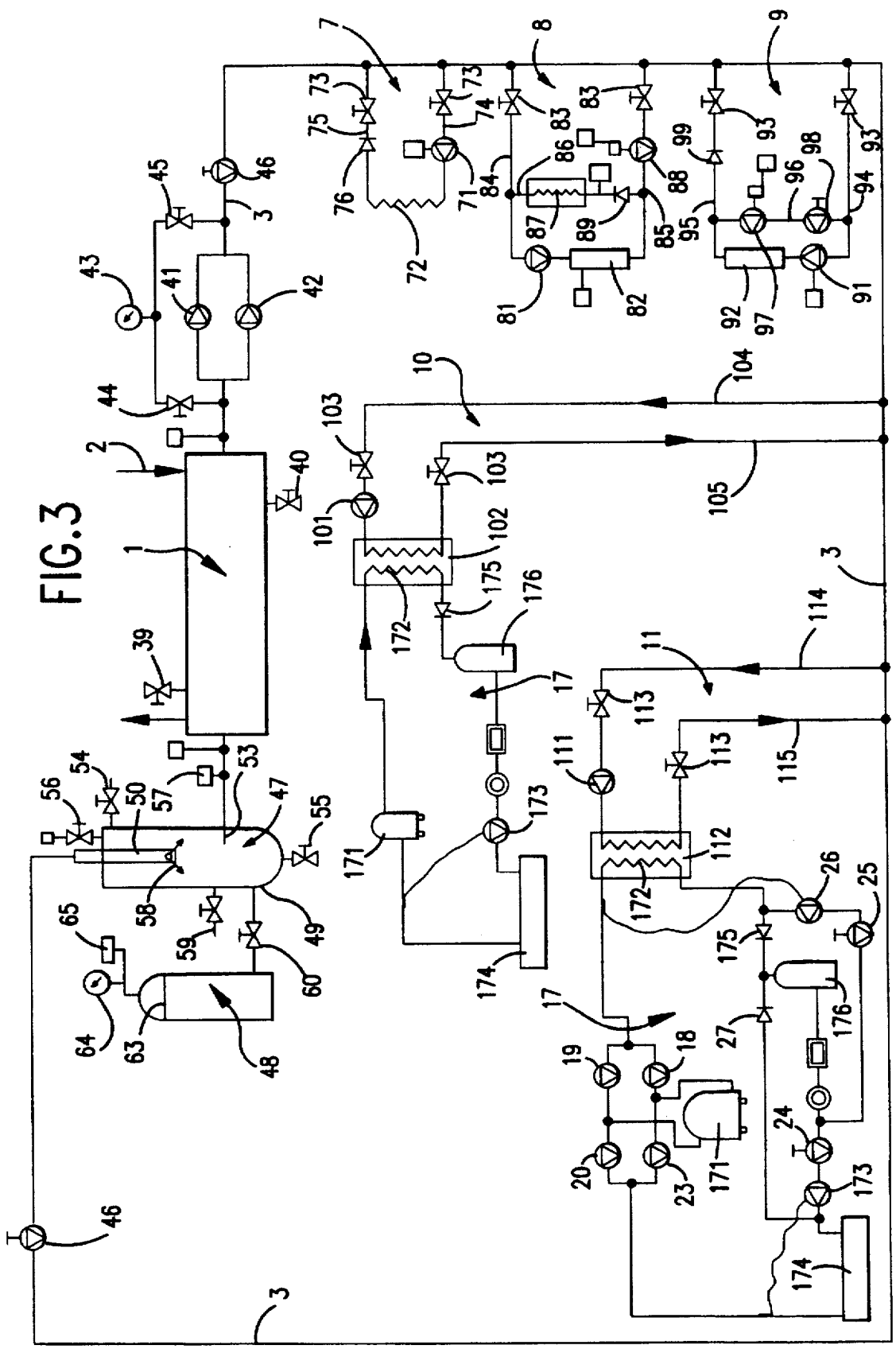
FIG. 3 is a general diagram of the main circulation circuit according to the invention, with several drawing loops connected to said circuit.

In accordance with FIGS. 1 and 3 a unit according to the invention, for the distribution and/or collection of cold and/or heat includes, in general:

(a) a main exchanger 1 of heat between, on the one hand, two refrigerant fluids 21 and 22, which are shown jointly under reference 2 in FIG. 3, in the course of vaporization, and, on the other hand, a heat transfer fluid 3, for example water with alcohol, which, depending on the operating regime of the unit, may be in two-phase form, that is to say as a homogeneous mixture of a liquid phase and of a solid phase, enabling it to be pumped;

(b) a means for producing cold, more particularly shown in FIG. 1, including two refrigerating loops 21 and 22, each including a compressor 51 or 52, each consisting of two motor-driven compressors 51a, 51b, or 52a, 52b, a condensing means or condenser 61 or 62 for the compressed refrigerant fluid, a means of heat exchange, of the plate or multitubular exchanger type, between the condensed refrigerant fluid and the abovementioned heat transfer fluid, included in the main exchanger 1, with the compressor 51 or 52 drawing in the vaporized refrigerant fluid;

(c) a closed main circuit 3 for continuous free circulation of the heat transfer fluid, enclosing, or connected, directly or indirectly, to the main exchanger 1, including two main pumps 41 and 42, in parallel, for circulating the heat transfer fluid, this circuit consisting of pipes assembled to one another, exhibiting a substantially uniform flow cross-section from one end to the other of said circuit;

(d) five drawing loops 7 to 11 for the heat transfer fluid, each including an attached pump 71, 81, 91, 101 or 111, for circulating said fluid, the suction and the discharge of which communicate with the same section of the main circuit 3, and at least one secondary exchanger, 72, 82, 92, 102 or 112, with a hot source and/or a cold source, depending on the utilizations or the circulation regime of the heat transfer fluid, this secondary exchanger being enclosed in or connected, directly or indirectly, to the drawing loop.

The arrangement and the operation, successively, of the means for producing heat shown in FIG. 1, of the circulation circuit 3 for the heat transfer fluid and of each of the drawing loops 7 to 11 will be detailed below.

In accordance with FIG. 1 the means for refrigeration production also has the following characteristics and specificities.

The two refrigerating loops 21 and 22 are independent from each other and arranged in parallel, with two condensing means 61 and 62 respectively, which are or are not combined in the same single condenser, and two heat exchange means respectively, each between the heat transfer fluid 3 and the refrigerant fluid 21 or 22, which are or are not combined in the same main exchanger 1, depending on two respectively separate passages.

Each refrigeration loop 21 or 22 additionally includes:

an oil separator 331 or 332;

an intermediate storage vessel 121 or 122 for the condensed refrigerant fluid, associated with a control conduit 131 or 132 for said refrigerant fluid;

a dehydrator 351 or 352 and a liquid sightglass 341 or 342, an electromagnetic valve 361 or 362;

a thermostatic pressure reducer 371 or 372, downstream of the main exchanger 1, comprising in the present case two independent circuits corresponding to the two refrigerant fluids 21 and 22 respectively;

and a liquid hammer arrester bottle 381 or 382, with or without incorporated heat exchanger.

Figure 2:
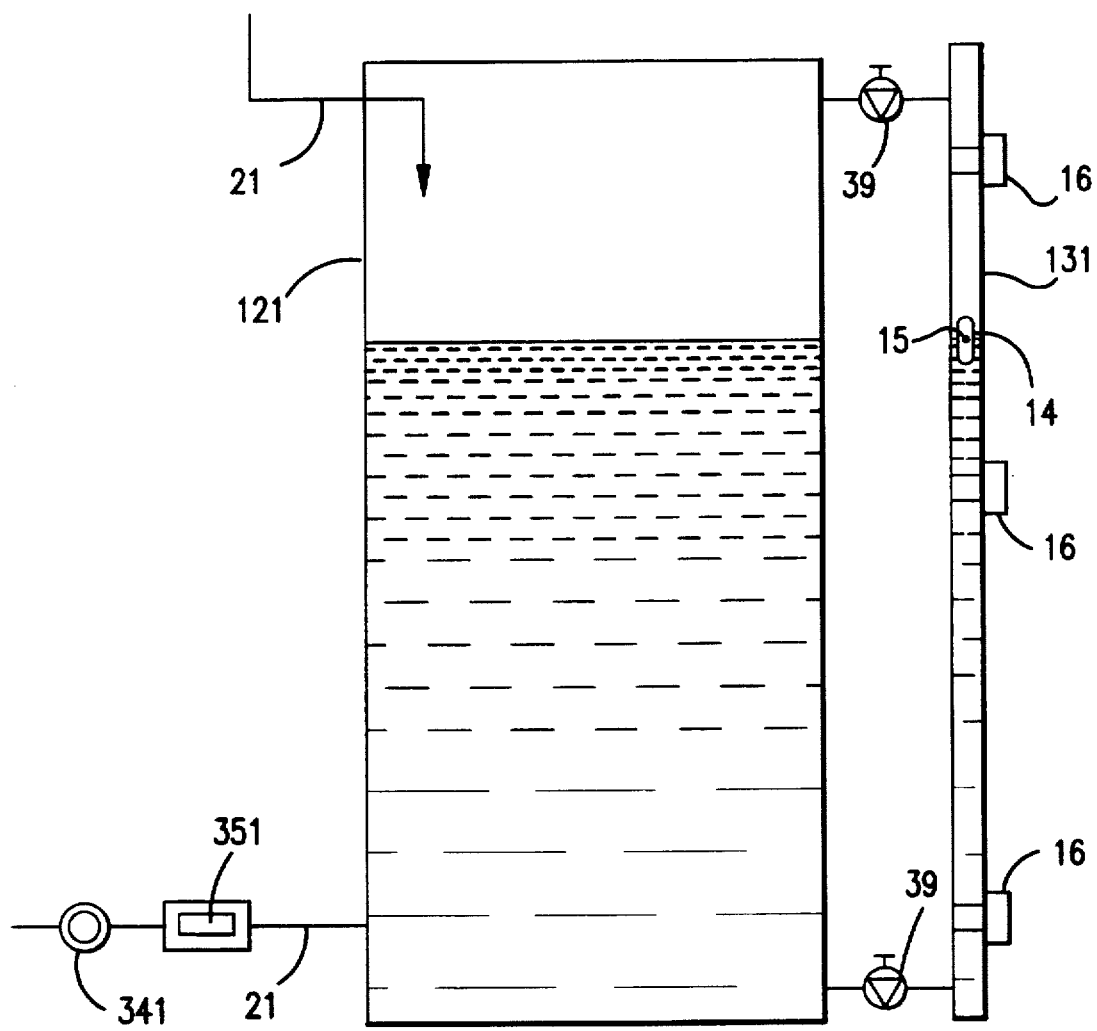
FIG. 2 shows diagrammatically a controlled storage vessel for refrigerant fluid, belonging to the means for producing cold according to FIG. 1.

FIG. 2 shows more particularly the intermediate storage vessel 121 of the refrigeration loop 21, which is associated with means making it possible to control the running or the operating regime of the compressor 51 and/or of the compressor 52, which include the control conduit 131, arranged vertically or inclined in relation to the vertical, and connected in parallel to the storage vessel 121.

A float 14 is fitted movably inside the conduit 131, to follow the level of the refrigerant fluid in said conduit. This float 14 comprises a physical means 15 for detection or identification, consisting of a permanent magnet embedded in the plastic casing of the float 14. Corresponding to the float 15, a number of detectors 16, each including a bistable electrical contact, are arranged and situated at different heights or levels outside the control conduit 131. The control conduit 131 may, furthermore, be isolated from the intermediate storage vessel 121 by valves 39.

Since the control conduit 131 is made of a nonmagnetic material, for example copper, and when the valves 39 are open, any change in the level of refrigerant fluid in the storage vessel 121 results in the movement of the float 14 in the control conduit 131, in front of one or more detectors 16, with bistable contacts, and this gives rise to one or more output signals due to reversal of the electrical contact.

The detectors 16 may be installed anywhere in the control conduit 131 and may be distributed along the height of said conduit. Since the level of the refrigerant fluid in the storage vessel 121 is a function of the evaporation pressure, of the condensation pressure, of the number of compressors 51 and 52 in operation, and of the external temperature, the level of the refrigerant fluid in the storage vessel 121 fluctuates. Corresponding to these fluctuations, various alarm or control, prevention or correction thresholds can be obtained by appropriately installing a suitable number of detectors 16 along the height of the conduit 131. All these output signals may, of course, be processed in any suitable means such as a calculator or microcomputer, according to any preestablished logic for controlling the refrigeration loop 21 and/or the refrigeration loop 22.

The main circulation circuit 3 for the heat transfer fluid is closed onto itself and consists essentially of the assembly of conduits or pipes connected to one another in a leakproof manner, while remaining compatible with the differential expansions or contractions of the pipes in relation to one another, bearing in mind the variations in temperature of the heat transfer fluid. Following the direction of travel of said fluid, this circuit includes:

the main exchanger 1 with an air purging valve 39 and a total drainage valve 40;

two twin pumps 41 and 42, each ensuring the circulation of the entire flow of the heat transfer fluid; they are brought into service alternately and are automated, so that in the event of failure of one, the other takes over automatically;

a pressure gauge 43 connected by two valves 44 and 45, upstream and downstream of the two pumps 41 and 42;

two manual valves 46 making it possible to isolate the unit consisting of the two pumps 41 and 42, the main exchanger 1, the degasser-separator 47 and the balancing capacity 48, which are described below, these being for the purpose of servicing;

a flow detector 57 enabling the flow rate of the heat transfer fluid to be controlled.

The unit represented by the degasser-separator 47 and the balancing capacity 48, upstream of the main exchanger 1, permits:

correct defrosting of the plant;
gravity separation of the heat transfer fluid;

topping-up said fluid;

regulation of the refrigeration or heating power and of the defrosting sequences.

In general, the degasser-separator 47 arranged upstream of the main exchanger 1 includes a vertically oriented storage vessel 49, with a heat transfer fluid delivery pipe 50 immersed down to an intermediate level of the storage tank, a heat transfer fluid extraction 53 below the end of the delivery pipe 50, a lower valve 55 for drawing off dense solid particles, an upper valve 54 for extracting light solid particles, especially in the form of sludge, and a degassing valve 56.

The internal diameter of the storage vessel 49 is determined so as to decrease considerably the velocity of the heat transfer fluid, in order to obtain a reliable separation of the dense or light solid particles, as well as of the gas phase, in relation to the heat transfer fluid returning to the main exchanger 1. The pipe 50 descends in the storage vessel 49 over a sufficient depth and is closed by a plug preventing the fluid from going directly toward the bottom of the storage vessel 49. Orifices are pierced at the bottom of the pipe 50 for the removal of the heat transfer fluid. The distance between the extraction 53 and the bottom of the storage vessel 49 allows good gravity separation of the solid particles which can be drained off via the lower valve 55. The upper valve 54, for its part, enables sludge or light particles to be purged. The degassing valve 56 may be equipped with an automatic vent. Also, a valve 59 on the storage vessel 49 allows the heat transfer fluid charge to be topped up.

A valve 60 makes it possible to connect the degasser-separator 47, and hence the main circuit 3, to a balancing capacity 48 for the heat transfer fluid. This capacity allows the circuit to be automatically topped up with said fluid. In its upper part it includes a pressurized flexible membrane 63 which makes it possible to absorb the changes in volume as a function of the changes in temperature of the heat transfer fluid. At the top of the capacity the air or gas pocket above the membrane 63 is taken to a pressure continuously controlled by a pressure gauge 64, with a constant pressure regulator 65. The latter triggers an alarm in the event of excessive pressure drop caused, for example, by a leak in circuit 3.

Each drawing loop 7 to 11 includes, in a known manner:
- an upstream leg 74, 84, 94, 104 or 114 and a downstream leg 75, 85, 95, 105 or 115, on either side of the secondary exchanger 72, 82, 92, 102 or 112;
- the additional pump 71, 81, 91, 101 or 111, situated in one of these legs;
- two stop valves 73, 83, 93, 103 or 113, enabling each drawing loop to be isolated from the main circuit 3.

The drawing loop 7 allows a cold room or a water tank to be cooled, the heat exchanger 72 being arranged in an enclosure which is not shown. The pump 71 is governed by a thermostat controlling the temperature of the medium to be cooled or heated. The downstream connection in the circuit 3 is arranged upstream of the upstream connection of the loop 7 in the same circuit. A nonreturn valve 76 is arranged in the drawing loop, especially in its downstream leg 75, to prohibit any flow of heat transfer fluid from the downstream leg 75 toward the upstream leg 74. This valve allows any interfering stream in the exchanger 72 to be eliminated, since, when the pump 71 is stopped, the pressure in the downstream leg 75 is higher than the pressure at the pump 71. By virtue of this particular arrangement it is possible to regulate reliably the ambient temperature in the abovementioned enclosure, to be cooled or to be heated, this being merely by controlling the pump 71 with a thermostat; no interfering current exists in the loop 7 when the pump 71 is stopped.

The drawing loop 8 makes it possible not only to refrigerate an enclosure, for example in a temperature region of between −1° and +1°, but also to defrost the exchanger 82, completely independently of the circulation of the heat transfer fluid in the main circuit 3.

For this purpose the drawing loop 8 includes:
- a bypass leg 86 between the upstream and downstream legs 84 and 85, with a heater 87 in said leg;
- a stop valve 88 in the part of the downstream leg 85 downstream of the junction between the bypass leg 86 and the downstream leg 85;
- a valve 89 situated in the bypass leg 86, upstream of the heater 87, this valve ensuring the flow of the heat transfer fluid only when the stop valve 88 is closed partially or completely; an environment thermostat, not shown, simultaneously stops the pump 81 and closes the valve 88.

During defrosting the pump 81 is set in forced operation, the valve 88 is closed and the heater 87 is switched on. A thermostat situated upstream of the heater 87 controls the temperature of the latter. The end of the defrosting will be detected by a thermostat, not shown, the bulb of which is placed on the outer surface of the secondary exchanger 82, for example in the fins of the latter.

In normal running the valve 89 prevents any circulation in the heater 87 when the valve 88 is open and when the pump 81 is in operation.

The valve 88 may be a proportional valve which, under the effect of a thermostat, makes it possible to control the quantity of heat transfer fluid bypassed from the main circuit 3 toward the bypass leg 86, this being for the purpose of controlling the temperature in the secondary exchanger 82.

The drawing loop 9 also makes it possible to refrigerate an enclosure in which it is desirable either to maintain a relatively high moisture content or a blowing temperature which is not too low. In this case, as in the case of the drawing loop 7, but in contrast to the drawing loop 8, the downstream connection is situated upstream of the upstream connection, in the direction of travel of the heat transfer fluid. The loop 9 comprises a bypass leg 96 between the upstream and downstream legs 94 and 95, with a controlled bypass valve 97 in said leg.

The temperature in the enclosure to be refrigerated is governed by a thermostat controlling the running or stopping of the pump 91. A valve 99 equivalent to the valve 76 prevents any interference stream when the pump 91 is stopped. The valve 97 is controlled by a regulator which can be servo-controlled either by the blowing temperature (for example the temperature of a room where people work) or by the ambient moisture content of the enclosure to be cooled.

The drawing loops 10 and 11 are associated in cascade with a circuit 17 for subzero refrigeration, in order to obtain relatively low temperatures, for example of the order of −20° to −40°, especially for cooling storage rooms for deep-frozen products or showcases for displaying said products. In this case, the exchangers 102 and 112 may be plate or coaxial exchangers or else multitubular exchangers fed by the pumps 101 and 111.

The subzero refrigeration circuit includes:
- a compressor 171, of high swept volume and low motor power, since in this case the low pressure is relatively weak and the delivery pressure relatively low;
- a condenser 172 situated in the secondary exchanger 102 or 112;
- a pressure reducer 173;

an evaporator 174;

and a storage bottle 176 for the refrigerant fluid in the circuit 17.

Importantly, the subzero refrigeration circuit 17 includes a valve 175 preventing any return of refrigerant fluid toward the condenser 172. This valve 175 actually prevents the refrigerant fluid from returning into the exchanger 102 or 112 and from flooding it completely, which would cause a double reaction on starting up the compressor 171, on the one hand owing to an increase in the high pressure on the delivery side and, on the other hand, owing to a drop in the low pressure, due to failure of feed of refrigerant fluid to the pressure reducer 173.

The subzero refrigeration circuit 17 associated with the drawing loop 11 includes reversing means consisting of valves 18, 19, 20 and 23, the maneuvering of which will be explained later, making it possible to reverse the circulation of the refrigerant fluid in the circuit 17, that is to say in order to operate, at the time of defrosting, the evaporator 174 as a condenser and the condenser 172 as an evaporator, the latter in heat exchange with the heat transfer fluid 3 which is drawn off. In normal running the valves 19 and 23 are open, whereas the valves 18 and 20 are closed, in order to convey the high pressure into the condenser 172. On the low-pressure side, in normal running, both the valves 175 and 27, whose directions of opening are respectively opposite, allow the condensed refrigerant fluid to flow toward the pressure reducing valve 173 and prohibit the flow of this same fluid directly toward the evaporator 174.

In the case of a repair or maintenance operation, closure of the valves 24 and 25 allows the refrigerant fluid to be recovered in liquid phase in the bottle 176.

During defrosting, the valves 19 and 23 are closed and the valves 18 and 20 are open, with the result that the compressed refrigerant fluid is directed toward the evaporator 174 acting as a condenser. The condensed fluid then flows through the valve 27, the valve 175 being closed, toward the bottle 176 and then through the pressure reducer 26, as far as the condenser 172 acting as an evaporator. Thus, during the stage of defrosting of the subzero refrigeration circuit 17, independently of the continuous circulation of the heat transfer fluid, the latter has the benefit of an input of cooling energy through the intermediacy of the drawing loop 11.

Figure 4:
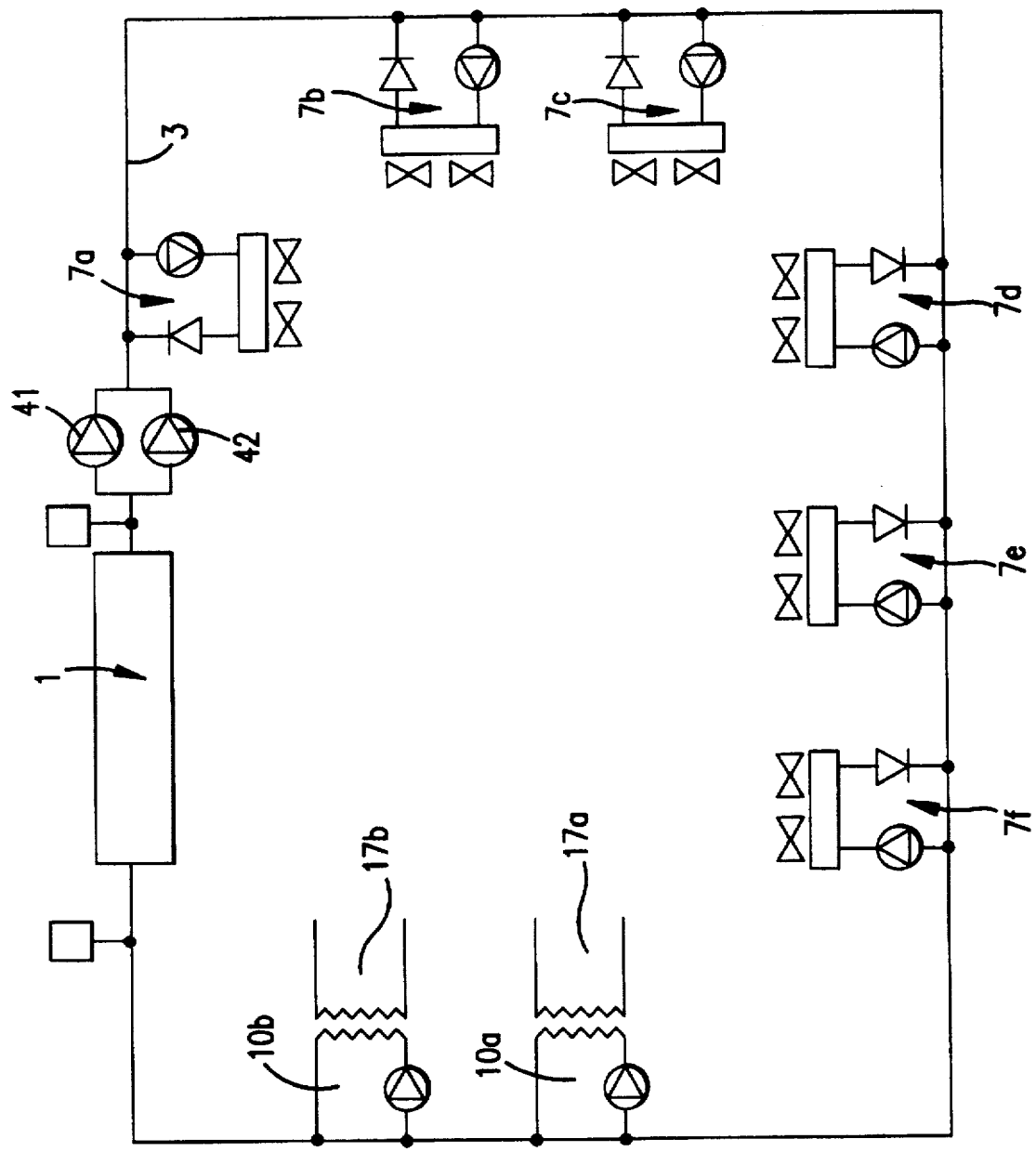
FIG. 4 shows an alternative form of a heat transfer unit according to the invention, in the context of a supermarket.

FIG. 4 shows a practical application of the unit or plant described in FIG. 3, in the case of commercial premises of the supermarket type, in the case of which the cooling requirements are generally staged in respect of temperatures according to the stations or utilizations concerned. Consequently, in accordance with FIG. 4, provision is made, in a staged manner, for, for example, five drawing loops 7a to 7f, with operating temperature levels of their secondary exchangers which increase respectively in the direction of travel of the heat transfer fluid from the cold end to the hot end of the main exchanger 1; the secondary exchangers of these drawing loops respectively may be in display showcases or cold rooms, which are generally ventilated.

Thus:

the drawing loop 7a corresponds to a cold room assigned to fresh meat or fish products;

loop 7b to a display showcase for fresh meat products;

loop 7c to a cold room or a cooked meat display showcase;

loop 7d to a cold room or display showcase for fruit and vegetables;

and loops 7e and 7f to laboratories.

Two drawing loops 10a and 10b are assigned in cascade to subzero refrigeration circuits 17a and 17b respectively, for example for the storage of deep-frozen products.

A unit in accordance with FIG. 4 is defrosted in the following manner:

complete stoppage of the refrigeration inputs, and especially of the means for producing cold according to FIG. 1;

simultaneous starting up, with forced circulation, of all the pumps of the drawing loops;

and, insofar as the refrigeration circuits 17a and 17b are concerned, starting up of their defrosting phase, as described above with reference to the drawing loop 11.

In these conditions the temperature of the heat transfer fluid rises gradually in the circuit 3 by virtue of the heat input from all the drawing loops. When a temperature of the order of 0° C. is detected at the exit of the main exchanger 1 the ventilations in the loops 7a and 7b are stopped, the pumps of said loops still remaining in operation. When this same temperature changes to a value of more than 2° C. the ventilation in the loops 7c is stopped and so on until a temperature of the order of 5° to 7° C. is obtained at the exit of exchanger 1.

By virtue of the low thermal inertia of the circulation circuit 3, this defrosting phase is limited in time, whereas the temperature drop of the unit, once defrosting has ended, can be rapid.

This defrosting procedure can be generalized to any traditional unit for distribution and/or collection of heat and/or of cold, including:

a main circuit connected to a storage vessel for the heat transfer fluid, for continuous circulation of said fluid, including an upstream leg at high pressure and a downstream leg at low pressure, which are separated by a pressure-reduction valve;

and drawing loops, each limited, without any additional pump, to a single secondary exchanger arranged between the upstream leg and downstream leg of the main circuit.

Figure 5:
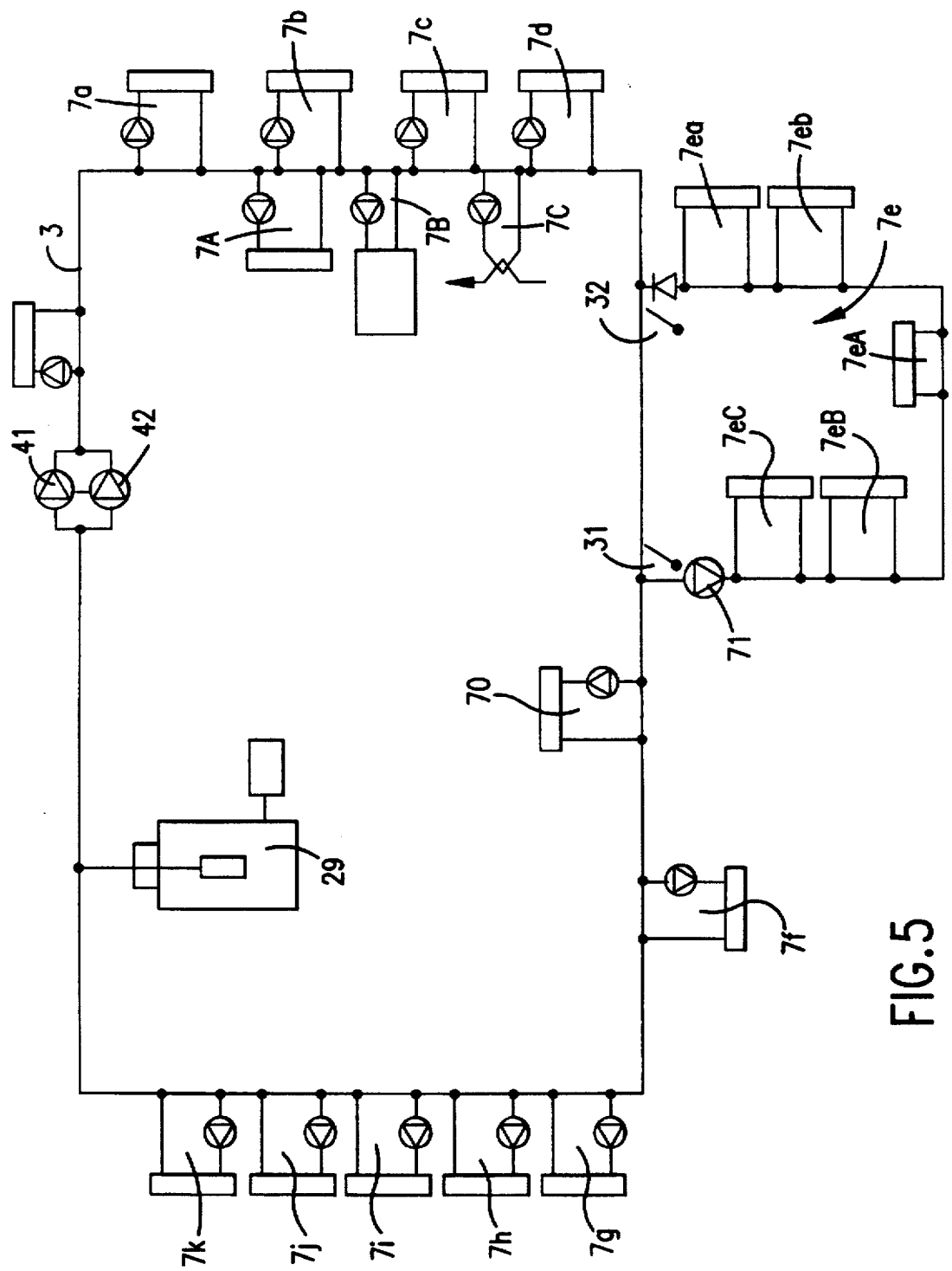
FIG. 5 shows another alternative form of a heat transfer unit according to the invention.

In accordance with FIG. 5 a thermal unit according to the invention is employed for generating and/or consuming cold and/or heat.

In accordance with the illustration of FIG. 5, the stations which use or consume cold and/or heat, with their respective drawing loops, are situated outside the main circuit 3, whereas the stations generating cold and/or heat, with their respective drawing loops, are situated inside the circuit 3.

The user or consumer stations and their respective loops 7a to 7d and 7g to 7k are, for example, heat pumps or refrigeration units.

The generator stations and their respective drawing loops 7A to 7D are, for example, heat pumps, boilers or iced water units.

In this case a storage vessel 29 for the heat transfer fluid, in homogeneous two-phase form, may be connected to the circuit 3 in order to stock refrigeration energy in the form of two-phase fluid during the periods of low refrigeration consumption, and to destock it toward the circuit 3 during the periods of high refrigeration consumption, by virtue of the low thermal inertia of the main circuit 3, in accordance with the invention.

The drawing loop 7e shown outside the main circuit 3 has the characteristic according to which it is itself associated with additional drawing loops, some consuming cold and/or heat, given references 7ea and 7eb, and others producing or generating cold and/or heat, given references 7eA, 7eB and 7eC.

With regard to the main circuit 3, two temperature sensors 31 and 32 are associated respectively with the entry and the exit of the drawing loop 7e, in order to determine, from a constant flow rate set by the pump 71, the quantity of cold and/or heat removed from or restored to the main heat transfer circuit 3.

The application shown in FIG. 5 has the following determining advantages:

- once the main circuit 3 is installed, it is possible at any time, including after the installation, to add to it additional drawing loops, reinforcing it with heat or with cold, at any point;
- the plant permits a continuous thermal proliferation corresponding to the variable heat or cold inputs of the various drawing loops, this being with an excellent energy balance;
- the various user or consumer stations or producers of heat and/or of cold can be advantageously distributed along the main circuit, depending on their thermal power levels and operating temperatures.

Advantageously and by way of example, with regard to the production of thermal energy, the drawing loops 7A to 7D may be, for example, an iced water unit, a boiler, a plate exchanger in an urban heating circuit and a reversible heat pump.

To end, the storage 29 of the heat transfer fluid in two-phase form, communicating with the main circuit 3, enables said main circuit to be considerably undersized, in a proportion of 50 to 70%, in relation to an application of the same fluid, in liquid single-phase form, without penalizing the performance of this same circuit, by virtue of its low thermal inertia.

The operating temperature of the main circuit 3, that is to say the mean temperature of the heat transfer fluid, can be optimized as a function of the seasons and of the user stations. Thus, in winter, by virtue of a heat transfer fluid temperature of the order of 25° C., the efficiency of the heat pumps will be at a maximum. In summer, while keeping the same fluid at 15° C., an excellent refrigeration efficiency will be obtained in the case of the cold units and the heat pumps in operating for the cooling of premises.

I claim:

1. A unit for distributing and/or collecting cold and/or heat, comprising:
   a) a main exchanger of heat between a refrigerant fluid in the course of vaporization and a heat transfer fluid to be pumped;
   b) a means for producing cold, including at least one refrigeration loop including a compressor for refrigerant fluid in gaseous phase, a means for condensing the compressed refrigerant fluid, a means for heat exchange between the condensed refrigerant fluid and the heat transfer fluid, included in the main exchanger, the compressor drawing in the vaporized refrigerant fluid;
   c) a closed main circuit for continuous free circulation of the heat transfer fluid, enclosing or connected to the main exchanger, including at least one main circulation pump for said heat transfer fluid, said circuit exhibiting an appreciably uniform flow cross-section from one end to the other of said circuit;
   d) at least one drawing loop for the heat transfer fluid, including an additional pump for circulating said heat transfer fluid, the suction and the delivery of which communicate with the same section of the main circuit, and at least one secondary heat exchanger with one of a hot or cold source, for the utilization of the heat transfer fluid, enclosed in or connected to the drawing loop;

wherein a heat transfer fluid drawing loop further comprises:
   an upstream leg and a downstream leg on either side of the secondary exchanger with the additional pump in one of the upstream and downstream legs;
   a bypass leg between the upstream and downstream legs, with a heater in said bypass leg;
   a stop valve in the part of the downstream leg downstream of a junction between the bypass leg and the downstream leg; and
   a valve situated in the bypass leg upstream of the heater, ensuring the flow of the heat transfer fluid only when the stop valve is closed.

2. The unit according to claim 1, wherein the means for producing cold includes two independent and parallel refrigeration loops, each of said refrigeration loops having a condensation means assembled in a single condenser or two separate condensers, and two means for heat exchange between the heat transfer fluid and the refrigerant fluid, said two means for heat exchange being assembled in the main exchanger along two respectively separate passages.

3. The unit according to claim 1, wherein the at least one refrigeration loop further includes an intermediate storage vessel for the condensed refrigerant fluid, said vessel associated with means for controlling the compressor, said means for controlling the compressor including a control conduit arranged vertically or inclined in relation to the vertical and being connected in parallel to said storage vessel, a float movable inside the conduit while following the level of the refrigerant fluid in the conduit, said float comprising a physical means of detection, and at least one float-detector situated outside the control conduit, wherein the output signal of said outside float detector is used for controlling the compressor.

4. The unit according to claim 1, wherein one of said at least one heat transfer fluid drawing loop is associated in cascade with a subzero refrigeration circuit, said subzero refrigeration circuit comprising a compressor, a condenser included in the secondary exchanger, a pressure reducer and an evaporator.

5. The unit according to claim 4, wherein the subzero refrigeration circuit further includes a valve preventing any return of refrigerant fluid toward the condenser.

6. The unit according to claim 4, wherein the subzero refrigeration circuit further includes means for reversing circulation of the refrigerant fluid, enabling the evaporator to operate as a condenser, and enabling the condenser to operate as an evaporator, in heat exchange with the heat transfer fluid.

7. The unit according to claim 1, wherein the closed main circuit for circulation of the heat transfer fluid further includes a degasser-separator arranged upstream of the main exchanger, said degasser-separator comprising: a storage vessel oriented vertically, a heat transfer fluid delivery pipe immersed in said storage vessel as far as an intermediate level of the storage vessel, an extraction pipe for extraction of said fluid below an end of the delivery pipe, a lower valve for draining off solids and an upper valve for extracting sludge.

8. The unit according to claim 1, wherein the closed main circuit and the degasser-separator communicate with a source of heat transfer fluid available to balance the capacity of heat transfer fluid within the closed main circuit to compensate for leakage of heat transfer fluid or changes in volume of the heat transfer fluid caused by changes in temperature.

9. The unit according to claim 1, further including two temperature sensors associated with an entrance and an exit of a drawing loop in order to determine the quantity of cold and/or heat removed from the closed main circuit for continuous free circulation of the heat transfer fluid.

10. A unit for distributing and/or collecting cold and/or heat, comprising:
   a) a main exchanger of heat between a refrigerant fluid in the course of vaporization and a heat transfer fluid to be pumped;
   b) a means for producing cold, including at least one refrigeration loop including a compressor for refrigerant fluid in gaseous phase, a means for condensing the compressed refrigerant fluid, a means for heat exchange between the condensed refrigerant fluid and the heat transfer fluid, included in the main exchanger, the compressor drawing in the vaporized refrigerant fluid;
   c) a closed main circuit for continuous free circulation of the heat transfer fluid, enclosing or connected to the main exchanger, including at least one main circulation pump for said heat transfer fluid, said circuit exhibiting an appreciably uniform flow cross-section from one end to the other of said circuit;
   d) at least one drawing loop for the heat transfer fluid, including an additional pump for circulating said heat transfer fluid, the suction and the delivery of which communicate with the same section of the main circuit, and at least one secondary heat exchanger with one of a hot or cold source, for the utilization of the heat transfer fluid, enclosed in or connected to the drawing loop;
   wherein said sources of cold and heat are connected as a bypass to the same drawing loop.

11. A process for defrosting a unit for distributing and/or collecting cold and/or heat, wherein said unit comprises:
   a) a main exchanger of heat between a refrigerant fluid in the course of vaporization and a heat transfer fluid to be pumped;
   b) a means for producing cold, including at least one refrigeration loop including a compressor for the refrigerant fluid in gaseous phase, a means for condensing the compressed refrigerant fluid, a means for heat exchange between the condensed refrigerant fluid and the heat transfer fluid, included in the main exchanger, the compressor drawing in the vaporized refrigerant fluid;
   c) a closed main circuit for continuous free circulation of the heat transfer fluid, enclosing or connected to the main exchanger, including at least one main circulation pump for said heat transfer fluid, said circuit exhibiting an appreciably uniform flow cross-section from one end to the other of said circuit; and
   d) a plurality of drawing loops for the heat transfer fluid, including a plurality of pumps for circulating said heat transfer fluid, the suction and the delivery of which communicate with the same section of the main circuit, and a plurality of secondary heat exchangers with a hot and/or cold source, for the utilization of the heat transfer fluid, enclosed in or connected to the drawing loops;
   said plurality of drawing loops being distributed and arranged in stages along the main circuit, according to the operating temperature levels of the associated secondary heat exchangers, increasing respectively from a cold end to a hot end of the main exchanger; said process including
   the means for producing cold being stopped;
   the pumps of the drawing loops being operated with forced circulation;
   and ventilation of the drawing loops being stopped successively in the order of the stagewise arrangement of the drawing loops from the cold end to the hot end of the main exchanger, in step with a rise in temperature of the heat transfer fluid.

* * * * *